United States Patent
Chan et al.

(10) Patent No.: US 9,511,634 B2
(45) Date of Patent: Dec. 6, 2016

(54) SYSTEMS AND METHODS FOR ANTICIPATORY TIRE PRESSURE CONTROL

(71) Applicant: Elwha LLC, Bellevue, WA (US)

(72) Inventors: Alistair K. Chan, Bainbridge Island, WA (US); Geoffrey F. Deane, Bellevue, WA (US); William D. Duncan, Mill Creek, WA (US); Philip A. Eckhoff, Kirkland, WA (US); Bran Ferren, Beverly Hills, CA (US); William Gates, Medina, WA (US); W. Daniel Hillis, Encino, CA (US); Roderick A. Hyde, Redmond, WA (US); Muriel Y. Ishikawa, Livermore, CA (US); Edward K. Y. Jung, Bellevue, WA (US); Jordin T. Kare, Seattle, WA (US); John Latham, Boulder, CO (US); Nathan P. Myhrvold, Bellevue, WA (US); Robert C. Petroski, Seattle, WA (US); Clarence T. Tegreene, Mercer Island, WA (US); David B. Tuckerman, Lafayette, CA (US); Thomas A. Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 119 days.

(21) Appl. No.: 14/528,709

(22) Filed: Oct. 30, 2014

(65) Prior Publication Data

US 2016/0121666 A1    May 5, 2016

(51) Int. Cl.
*B60T 1/10* (2006.01)
*B60C 23/00* (2006.01)

(52) U.S. Cl.
CPC .................. *B60C 23/002* (2013.01)

(58) Field of Classification Search
CPC .... B60C 23/00; B60C 23/002; B60C 23/0416; B60T 1/10; H04H 20/57; B60R 11/04; B60L 15/2045
USPC 701/1, 36, 123; 455/3.05; 348/148; 340/442
See application file for complete search history.

(56) References Cited

U.S. PATENT DOCUMENTS

| | | |
|---|---|---|
| 5,516,379 A | 5/1996 | Schultz |
| 5,846,354 A | 12/1998 | Winston et al. |
| 6,278,363 B1 * | 8/2001 | Bezek ................. B60C 23/0416 340/442 |
| 7,379,800 B2 | 5/2008 | Breed |
| 7,760,080 B2 | 7/2010 | Breed et al. |
| 9,296,263 B2 * | 3/2016 | Muthukumar ........... B60T 1/10 |
| 2005/0102073 A1 | 5/2005 | Ingram, II |
| 2006/0212193 A1 | 9/2006 | Breed |
| 2006/0244581 A1 | 11/2006 | Breed et al. |
| 2008/0243334 A1 | 10/2008 | Bujak et al. |

(Continued)

*Primary Examiner* — Yuri Kan
(74) *Attorney, Agent, or Firm* — Foley & Lardner LLP

(57) ABSTRACT

A vehicle tire pressure control system includes a road sensor configured to acquire road data regarding a road at an advanced location ahead of a current location of a vehicle; a pressure regulator configured to control the air pressure within a tire of the vehicle during operation of the vehicle; and a controller configured to control operation of the pressure regulator and vary the air pressure within the tire based on the road data.

32 Claims, 4 Drawing Sheets

(56) References Cited

U.S. PATENT DOCUMENTS

| | | | |
|---|---|---|---|
| 2010/0073158 A1 | 3/2010 | Uesaka et al. | |
| 2011/0313647 A1* | 12/2011 | Koebler | B60L 15/2045 701/123 |
| 2014/0300738 A1* | 10/2014 | Mueller | B60R 11/04 348/148 |
| 2014/0302774 A1* | 10/2014 | Burke | H04H 20/57 455/3.05 |
| 2015/0005982 A1* | 1/2015 | Muthukumar | B60T 1/10 701/1 |

* cited by examiner

SYSTEMS AND METHODS FOR ANTICIPATORY TIRE PRESSURE CONTROL

BACKGROUND

Vehicles such as automobiles utilize wheels having tires inflated with air. The air pressure within the tire can impact driving characteristics such as speed, handling, fuel economy, and the like. The tires may be inflated or deflated to regulate the air pressure within the tires and optimize one or more driving characteristics of the vehicle.

SUMMARY

One embodiment relates to a vehicle tire pressure control system, including a road sensor configured to acquire road data regarding a road at an advanced location ahead of a current location of a vehicle; a pressure regulator configured to control the air pressure within a tire of the vehicle during operation of the vehicle; and a controller configured to control operation of the pressure regulator and vary the air pressure within the tire based on the road data.

Another embodiment relates to a vehicle, including a tire configured to support at least a portion of the vehicle; and a tire pressure control system configured to control the air pressure within the tire during operation of the vehicle, the tire pressure control system including a road sensor configured to acquire road data regarding a road at an advanced location ahead of a current location of the vehicle; a pressure regulator configured to control the air pressure within the tire during operation of the vehicle; and a controller configured to control operation of the pressure regulator and vary the air pressure within the tire based on the road data.

Another embodiment relates to a tire pressure control system, including a road sensor configured to acquire road data regarding an advanced location ahead of a current location of a vehicle on a road; an environment sensor configured to acquire environment data regarding an environment at an exterior of the vehicle; a vehicle sensor configured to acquire vehicle data regarding operation of the vehicle; a pressure regulator configured to control an internal pressure of a tire; and a controller configured to determine a target air pressure for the tire based on the road data, environment data, and the vehicle data; and control operation of the pressure regulator based on the target pressure and a current air pressure of the tire.

Another embodiment relates to a method of controlling tire pressure, including receiving road data from a road sensor regarding a road at an advanced location ahead of a current location of a vehicle; receiving tire data including an indication of a current air pressure of a tire of the vehicle; determining a target pressure for the tire based on the road data; and controlling the air pressure of the tire based on the current air pressure and the target air pressure such that the air pressure of the tire is at the target pressure when the vehicle is at the advanced location.

Another embodiment relates to a method of controlling tire pressure, including receiving road data from a road sensor regarding a road for an advanced location ahead of a current location of a vehicle; determining a target pressure for a tire of the vehicle; and controlling the air pressure of the tire based on the target pressure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
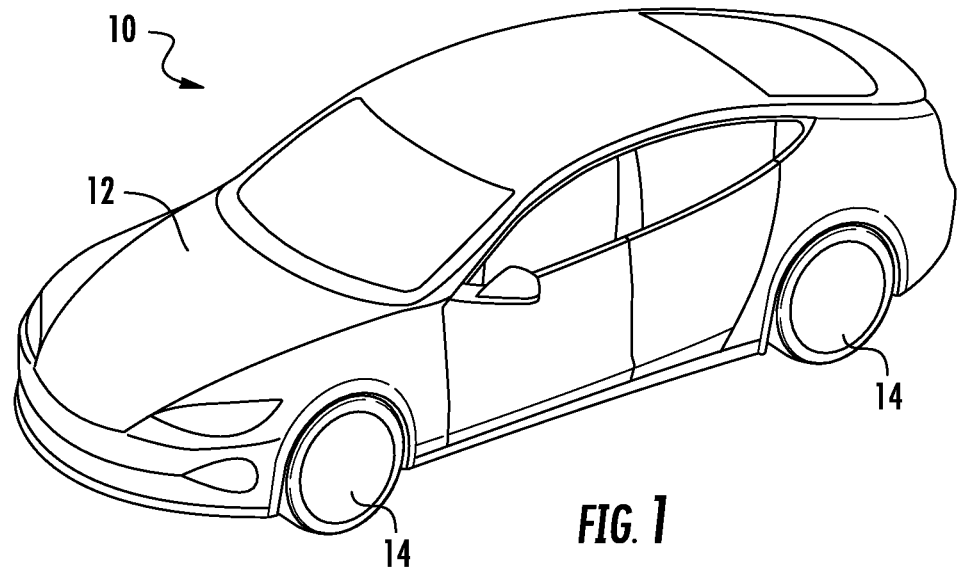
FIG. 1 is a perspective view of a vehicle including a tire pressure control system according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to systems and methods for anticipatorily controlling the internal air pressure of one or more tires of a vehicle. For example, by acquiring road condition information about a portion of road at an advanced location ahead of a current location of a vehicle, an appropriate tire pressure for one or more tires can be determined such that as the vehicle arrives at the advanced location, the tire pressure of one or more tires of the vehicle is already at a target pressure previously determined for the road conditions at the advanced location.

Vehicles such as automobiles travel across various types of roads and other terrain, and encounter varying surface types (e.g., gravel, paved, etc.) and surface conditions (e.g., wet, flooded, icy, snowy, etc.) in addition to various obstacles (e.g., stopped cars, etc.), traffic conditions, and the like. According to various embodiments herein, a vehicle includes one or more sensors that acquire data regarding such road conditions. Based on the road conditions, the tire pressure in one or more tires can be adjusted accordingly (e.g., maintained, increased, or decreased). Varying the tire pressure can be used to optimize various characteristics of vehicle operation, including vehicle handling, vehicle speed, vehicle fuel/energy consumption, operating requirements of a vehicle engine or motor, and the like.

Figure 2:
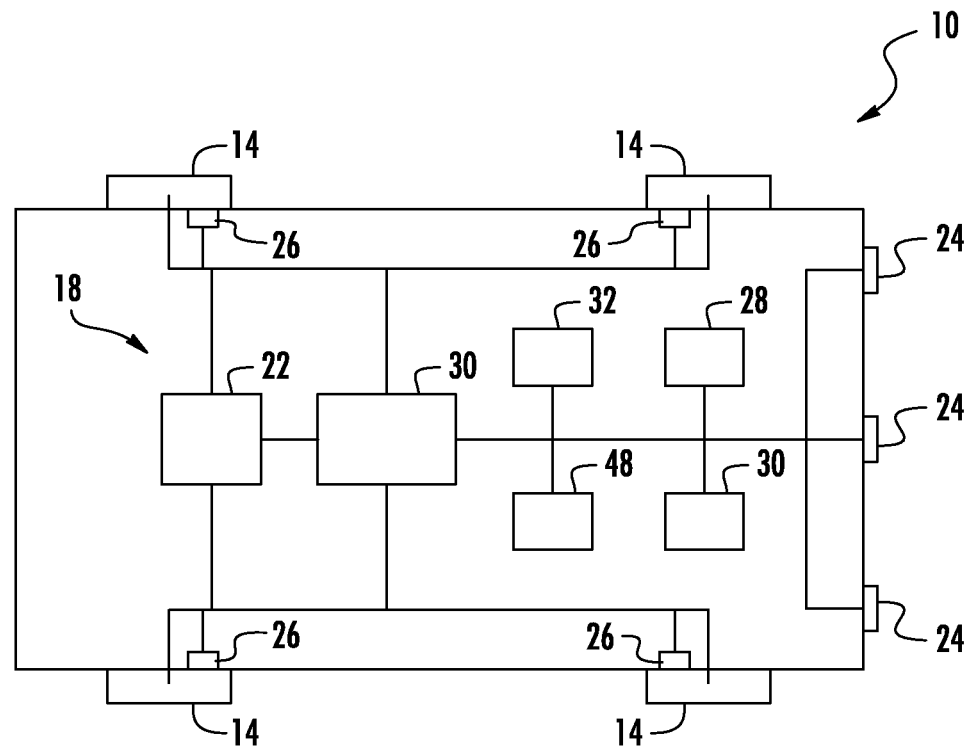
FIG. 2 is a schematic top view of the vehicle of FIG. 1 according to one embodiment.
Figure 3:
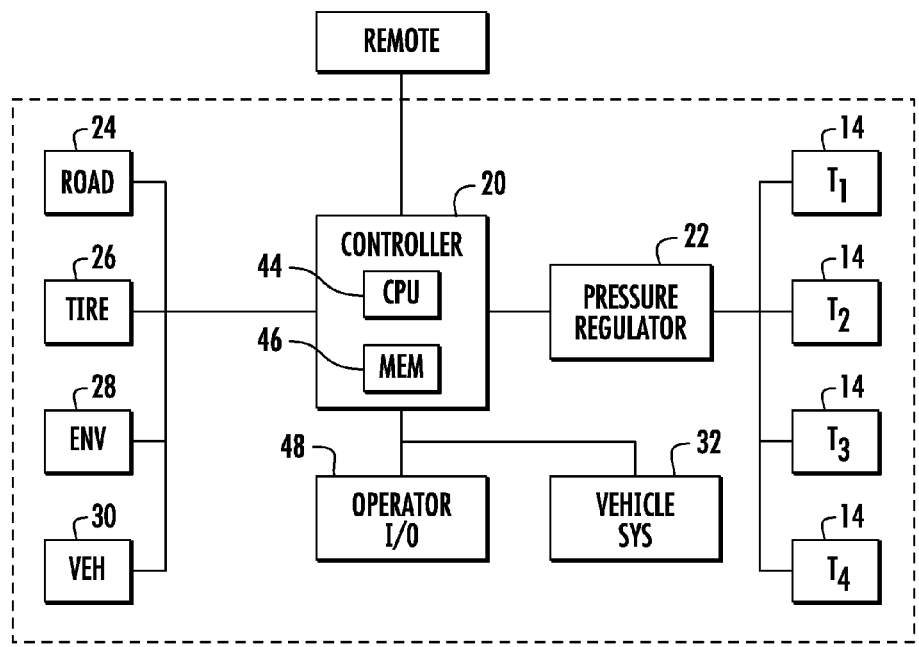
FIG. 3 is a side view of the vehicle of FIG. 1 travelling on a road according to one embodiment.

Referring now to FIGS. 1-3, vehicle 10 is shown according to one embodiment. Vehicle 10 includes vehicle body 12 and tires 14. Vehicle 10 is in one embodiment an automobile using an engine and/or electric motor. Tires 14 provide support for vehicle 10 and are configured to be inflated to a desired internal air pressure. While various embodiments disclosed herein are described with respect to automobiles, it should be understood that the teachings herein may extend to a wide range of vehicles, including buses, trucks, motorcycles, bicycles, all-terrain vehicles (ATVs), and any other vehicles where tire pressure may be regulated based on anticipating road or terrain conditions.

As shown in FIG. 2, in one embodiment vehicle 10 includes tire pressure control system 18. System 18 is configured to regulate the air pressure within tires 14 based on a variety of factors. System 18 receives various types of data relating to vehicle 10 and the surrounding environment and road conditions and controls the air pressure within tires 14 based on the data and/or additional inputs from an operator of vehicle 10. In one embodiment, system 18 includes road sensors 24, tire sensors 26, environment sensors 28, and vehicle sensors 30. System 18 may include one or more of each type of sensor. Further, while specific sensor types are described herein for purposes of illustration, it should be understood that the structure and/or function of specific sensors may be divided among further sensors, and alternatively, the functionality and/or structure of multiple sensors shown in FIG. 2 may be combined into a single integrated sensor.

System 18 further includes controller 20 and pressure regulator 22. Controller 20 is configured to receive various types of data and control operation of pressure regulator 22 accordingly. Based on various data and/or user inputs, controller 20 may control pressure regulator 22 to maintain, increase, or decrease the air pressure within one or more tires 14.

As shown in FIG. 3, according to one embodiment, controller 20 includes processor 44 and memory 46. Processor 44 may be implemented as a general-purpose processor, an application specific integrated circuit (ASIC), one or more field programmable gate arrays (FPGAs), a digital-signal-processor (DSP), a group of processing components, or other suitable electronic processing components. Memory 46 is one or more devices (e.g., RAM, ROM, Flash Memory, hard disk storage, etc.) for storing data and/or computer code for facilitating the various processes described herein. Memory 46 may be or include non-transient volatile memory or non-volatile memory. Memory 46 may include database components, object code components, script components, or any other type of information structure for supporting the various activities and information structures described herein. Memory 46 may be communicably connected to processor 44 and provide computer code or instructions to processor 44 for executing the processes described herein.

Pressure regulator 22 is configured to control the pressure within tires 14 of vehicle 10 during operation of vehicle 10 (e.g., while an operator is driving vehicle 10 along a road, etc.). In one embodiment, pressure regulator 22 controls the pressure within all of the tires 14 of vehicle 10. In other embodiments, pressure regulator controls the pressure within only a portion of the tires 14 (e.g., rear only, front only, etc.) of vehicle 10. In some embodiments, multiple pressure regulators are provided, each controlling tire pressure in one or more of the tires. In yet further embodiments, a user may define (e.g., via operator device 48) which tires 14 are controlled by pressure regulator 22, and time periods for such control (e.g., based on time of day, speed of the vehicle, a driver of the vehicle, etc.). Pressure regulator 22 in one embodiment includes a compressor and appropriate valving to regulate the supply of compressed air to tires 14 during operation of vehicle 10. In an embodiment, pressure regulator 22 additionally includes an accumulator tank 23 to store compressed air. Air from the accumulator is supplied as needed to the tires, while the compressor is used to supply air to the accumulator as it becomes depleted. In an embodiment, pressure regulator 22 includes a release valve 25 to allow air to escape from the tires, thereby reducing tire pressure. In some embodiments, pressure regulator 22 includes a pump 27 for more rapid removal of air from the tires.

Road sensors 24 are configured to acquire data (e.g., road data) regarding various road conditions along a road. Road sensors 24 may be placed in any suitable locations on vehicle 10 (e.g., integrated into body 12, etc.), and any suitable number of road sensors 24 may be used. In one embodiment, road sensors 24 acquire data regarding a section of road ahead of a current position of vehicle 10 (e.g., at an advanced location). For example, as vehicle 10 travels along a road, road sensors 24 may acquire data regarding sections of road 10 feet, 50 feet, 100 feet, or more ahead of the current position of the vehicle.

Road data acquired by road sensors 24 may include various types of data. In one embodiment, road data includes a surface state of a road or other terrain, such as a degree of wetness, a depth of water, a rate of rainfall or flooding, a presence or snow, ice, oil, or mud, the presence of holes, bumps, or surface roughness, and the like. In other embodiments, road data includes a surface type of a road or other terrain, such as gravel, dirt, concrete, tarmac, asphalt, pavement, and the like. In further embodiments, road data includes a surface temperature (or rate of change of temperature), lane or road width, speed limit sign indications, warning signs, and the like. In some embodiments, road data includes data on road slope or changes in slope, e.g., on upcoming elevation changes associated with hills or troughs. In some embodiments, road data includes data on road curvature, such as the direction of a curve, the radius of a curve, banking of a curve, etc. In yet further embodiments, road data includes data regarding other vehicles and/or obstacles, such as the presence and location of other vehicles or obstacles (e.g., in a road lane, in a roadside ditch, etc.), the relative speed or acceleration of other vehicles or obstacles (e.g., braking, sliding, weaving, etc.), and the like.

Road sensor 24 may be any suitable type of sensor configured to acquire a desired road data, including infrared sensors (e.g., a far-infrared (FIR) device, etc.), radar devices (e.g., a micropower impulse radar (MIR) device, etc.), ultraviolet (UV) sensors, lidar sensors, Doppler sensor devices, still image or video cameras, and the like. Electromagnetic sensors (using infrared, visible, or ultraviolet, or RF wavelengths) can monitor specific attributes of the electromagnetic waves, such as their polarization or spectrum. In some embodiments, combinations of different types of sensors are used so as to be able to capture various types of road data. In further embodiments, road sensor 24 is yet a different type of sensor other than those described herein. Road sensor 24 is configured to provide road data to controller 20 or other components of system 18.

Tire sensor 26 is configured to acquire data (e.g., tire data) regarding tire 14 of vehicle 10. In one embodiment, one tire sensor 26 is provided for each tire 14. In other embodiments, more or fewer tire sensors 26 may be utilized. Tire sensor 26 may be a contact or non-contact sensor, and may be positioned at any suitable location relative to tire 14. Tire sensor 26 may be or include a pressure sensor configured to measure an air pressure within tire 14, a temperature sensor configured to measure a temperature of tire 14, a tread sensor configured to measure a depth, width, or other condition of a tread of tire 14, and the like. Tire sensor 26 is configured to provide tire data to controller 20 and/or other components of system 18.

Tire data acquired by tire sensor 26 may include a variety of types of data. For example, in one embodiment, tire data includes an air pressure of the tire such that controller 20 can determine whether tire 14 requires more or less air pressure. In other embodiments, tire data may include other data regarding tire 14, such as a temperature of the tire, a compliance of the tire, a tread pattern of the tire, width of the tire, slippage of the tire, an acceleration of the tire, and the like. In some embodiments, tire data may include a recommended tire pressure, a UTQG (Universal Tire Quality Guide) rating of the tire, a traction, a friction coefficient (static or rolling) of the tire, and a relationship between friction coefficient of the tire and tire pressure. Some tire data (e.g., friction or traction data) can differ depending on the type of road surface (e.g., gravel, pavement, dirt, etc.) and the condition of the road surface (e.g., icy, wet, oily, etc.), and controller 20 can be configured to use the appropriate data. Tire data may include other types of data according to other alternative embodiments.

Environment sensor 28 is configured to acquire data (e.g., environment data) regarding an environment at an exterior of vehicle 10. Any suitable number of environment sensors 28 may be utilized, and environment sensors 28 may be placed at any suitable location on or within vehicle 10. For example, environment sensor 28 may be or include a temperature sensor configured to sense an ambient temperature at an exterior of the vehicle, a pressure sensor configured to measure an ambient pressure at an exterior of the vehicle, a wind sensor configured to measure wind conditions at an exterior of the vehicle, a visibility sensor configured to detect current visibility conditions at an exterior of vehicle 14, and the like. Other types of environment sensors may be utilized according to various alternative embodiments. Environment sensors 28 are configured to provide environment data to controller 20 and/or other components of system 18.

Environment data acquired by environment sensor 28 includes a variety of types of data regarding an environment at an exterior to vehicle 10. In some embodiments, environment data includes temperature and/or pressure regarding ambient temperature or pressure conditions at an exterior of vehicle 10. In other embodiments, environment data may provide an indication of weather conditions such as rain, snow, wind, hail, and the like. In yet further embodiments, environment data provides an indication of current visibility conditions at or near vehicle 10. Environment data may include various other types of data according to other alternative embodiments.

Vehicle sensor 30 is configured to acquire data (e.g., vehicle data) regarding the operation of vehicle 10. Vehicle sensors 30 may be provided in any suitable locations, and any appropriate number of vehicle sensors 30 may be utilized. Vehicle sensor 30 may be configured to capture a wide variety of data regarding vehicle 10, including a vehicle speed, a vehicle acceleration, vehicle braking, fuel/charge levels for a vehicle engine/motor, and the like. In some embodiments, vehicle sensor 30 is configured to acquire data regarding a weight of vehicle 10, or alternatively, a load distribution for vehicle 10. In various alternative embodiments, various other types of vehicle sensors may be utilized to acquire other types of vehicle data. Vehicle sensor 30 is configured to provide vehicle data to controller 20 and/or other components of system 18.

Vehicle systems 32 may be include one or more vehicle systems that communicate data (e.g., vehicle data) to or receive data from controller 20 or other components of tire pressure control system 18. For example, vehicle systems 32 may include an on-board navigation system such that vehicle data for a planned route of travel for vehicle 10 may be provided to controller 20. In other embodiments, vehicle systems 32 may include heating, cooling, or other systems of vehicle 10, such that vehicle data regarding the current use of these or other vehicle systems may be provided to controller 20. In other embodiments, other vehicle systems may provide other types of data to controller 20 or other components of system 18.

Operator input/output device 48 is configured to receive inputs (e.g., operator data) from and/or provide outputs to an operator or passenger of vehicle 10. For example, in some embodiments, device 48 is configured to receive operator data regarding driving preferences or settings for one or more drivers of vehicle 10. For example, a first driver may want to optimize riding comfort while driving, while a second driver may wish to optimize fuel economy, speed, or another driving characteristic. Inputs regarding these or other preferences or settings may be received at device 48 and provided to controller 20. Device 48 may include a wide variety of devices, including various displays (touch screen displays, etc.), buttons, keyboards, microphones, speakers, and the like, and may include voice recognition and/or text-to-speech functionality to facilitate usage of device 48 during operation of vehicle 10.

Remote device 50 is or includes one or more remote devices configured to transmit data (e.g., remote data) to and/or receive data from vehicle 10. In some embodiments, device 50 includes a remote navigation or mapping system, a weather information service, a traffic alert provider, and the like. As such, the remote data provided by device 50 to vehicle 10 (and in turn tire pressure control system 18) may include various types of remote data, such as navigation or map data, weather data, road or traffic conditions (e.g., road blockages, traffic jams, estimated travel times between points, upcoming curves or hills, upcoming road surfaces, etc.), and the like. Remote data may include other types of data according to various other embodiments.

Figure 4:
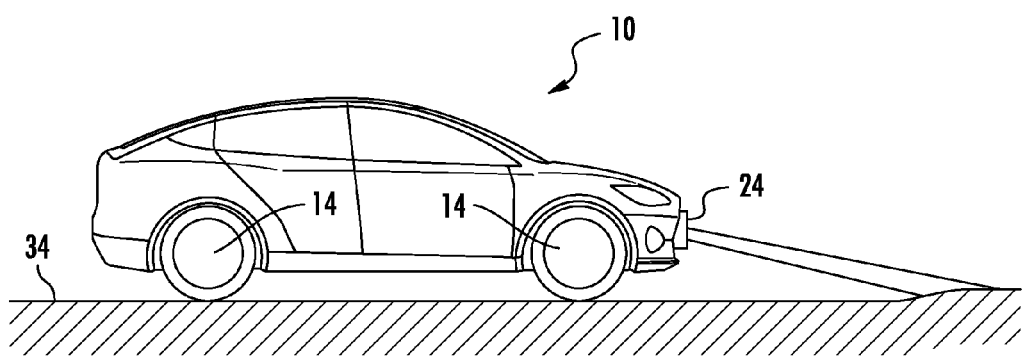
FIG. 4 is a top view of vehicle travelling on a road according to another embodiment.
Figure 5:
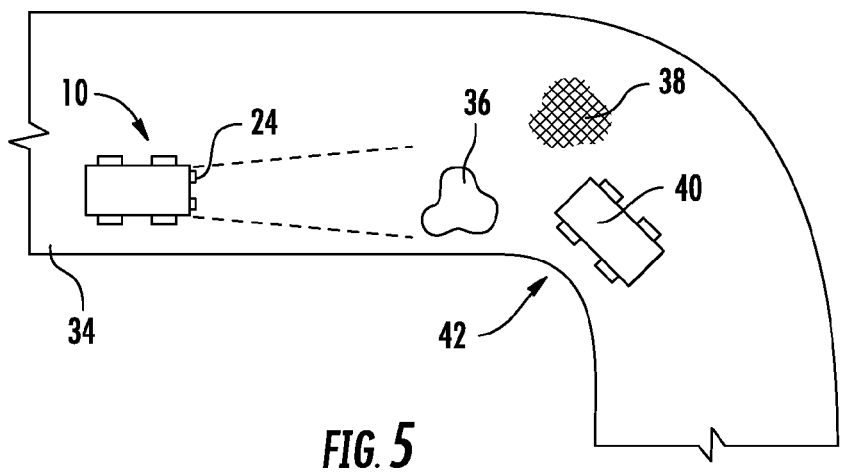
FIG. 5 is a schematic block diagram of a tire pressure control system for a vehicle according to one embodiment.

Referring now to FIGS. 4-5, vehicle 10 is shown travelling along road 34 according to one embodiment. It should be noted that while various embodiments disclosed herein are described with vehicle 10 travelling along a road, the teachings herein extend to any type of terrain, including off-road applications, trails, highways, and the like. As shown in FIGS. 4-5, in one embodiment, road sensors 24 of vehicle 10 are configured to acquire road data regarding an advanced location of road 34 (e.g., at a location ahead of a current location of vehicle 10). The road data may include, for example, data regarding an obstacle 36, including a size and/or location of the obstacle, a predicted time until the vehicle arrives at the location of the obstacle, and the like. Similar road data may be acquired regarding surface condition 38 of road 34, including a surface state (e.g., wet, snowy, icy, etc.), a surface type (e.g., dirt, gravel, pavement, etc.), and the like. Surface condition 38 may further be a change in a surface type (e.g., from pavement to gravel, etc.).

Referring further to FIG. 5, road sensors 24 may be further configured to capture data regarding one or more other vehicles 40 travelling along road 34. For example, road sensors 24 may acquire data related to a speed of vehicle 40 (e.g., a relative or absolute speed, etc.), an acceleration of vehicle 40 (e.g., a relative or absolute acceleration, etc.), a position and/or direction of travel, and the like. In some embodiments, road sensors 24 are configured to detect abnormal movements of other vehicle 40, including abrupt changes in speed (e.g., due to excessive braking, etc.), direction (e.g., weaving, swerving, etc.), travel in a wrong lane, a roadside area or ditch, etc., and the like. In one embodiment, road sensor 24 is further configured to acquire data regarding the contour of road 34, including one or more turns or curves 42, an incline or decline in road 34, a banking of road 34, a lane width or shoulder for road 34, etc. As such, road sensor can provide road data to controller 20 regarding upcoming turns, inclines, and/or declines.

Road sensors 24 provide acquired road data to controller 20 of tire pressure control system 18. Referring back to FIG. 3 and as noted above, controller 20 may further receive other types of data, including tire data (e.g., a tire pressure, temperature, tread condition, etc.), environment data (e.g., ambient temperature, pressure, local weather conditions, etc.), vehicle data (e.g., vehicle speed, acceleration, weight/loading distribution, etc.), remote data (e.g., weather or traffic reports, road condition reports, road geometry, etc.), and the like.

Figure 6:
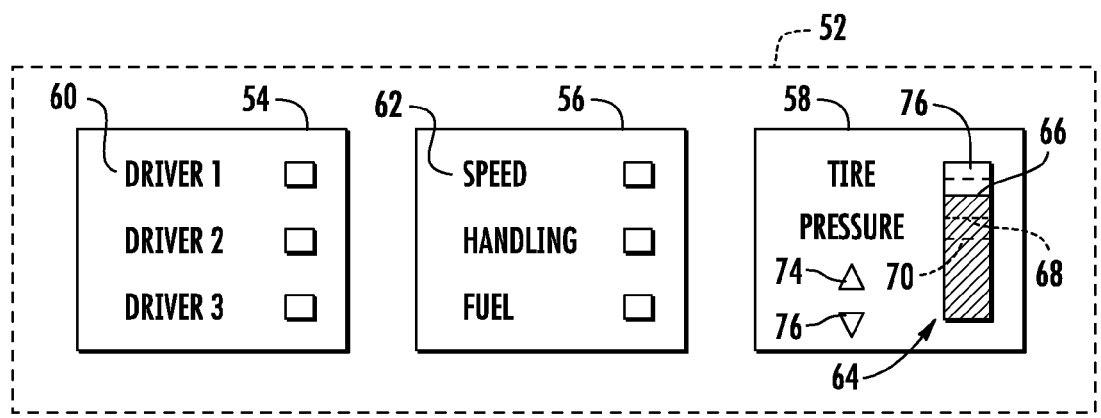
FIG. 6 is an illustration of a user interface for a vehicle usable with a tire pressure control system according to one embodiment.

In addition, controller 20 may receive operator data from an operator of vehicle 10 regarding one or more operator preferences, settings, etc. For example, referring to FIG. 6, in one embodiment operator input/output device 48 is configured to provide a user interface 52 via, for example, a touch screen display. Controller 20 may be configured to provide interface 52 upon a request of a user, based on a predicted change in tire pressure (e.g., so that the driver is made aware of and/or can manually override a change in tire pressure), etc. As shown in FIG. 6, interface 52 includes a number of display portions, including a driver indicator display portion 54, a driving preference display portion 56, and a tire pressure display portion 58.

Display portion 54 provides a display identifying one or more drivers 60. An operator of vehicle 10 can identify him or herself by selecting the appropriate driver listed in display portion 54. Controller 20 may store operator preferences or settings (e.g. in memory 46) such that air pressure of tires 14 can be adjusted based on the preferences or settings of the current driver. In some embodiments, based on a selection of driver 60, controller 20 provides a default selection of one of preferences 62 shown in display 56. For example, based on past usage, controller 20 may store data regarding drivers and preferences.

In one embodiment, display portion 56 enables an operator of vehicle 10 to override a default selection of preference 62 and select a different preference. As shown in FIG. 6, preferences 62 may include options such as speed, handling, fuel, and the like. In one embodiment, controller 20 is configured to optimize the selected characteristic by adjusting the air pressure of one or more tires accordingly. For example, to optimize speed or fuel efficiency, a greater tire pressure may be utilized, while to optimize handling, a lower tire pressure may be utilized. In other embodiments, other preferences may be provided as part of display portion 56 (e.g., ride comfort, etc.).

According to one embodiment, tire pressure display portion 58 of user interface 52 provides an operator of vehicle 10 various information regarding a current tire pressure. As shown in FIG. 6, information regarding a single-pressure is shown (e.g., a pressure applicable to all tires of a vehicle). In some embodiments, air pressure for individual tires may be shown as part of display portion 58. Display portion 58 includes tire pressure indicator 64, which may provide various types of information regarding the air pressure of one or more tires, including current pressure 66, recommended pressure 68, and minimum/maximum pressures 70, 72 (e.g., defining a recommended or safe range of air pressure). Display portion 58 further includes one or more buttons 74, 76, which enable a user to provide operator inputs to manually adjust the air pressure within one or more tires.

It should be noted that the various display portions of FIG. 6 are provided for purposes of illustration, and that according to various alternative embodiments, more or fewer display portions may be provided, display portions shown as individual display portions may be divided into further multiple display portions, and display portions shown as multiple display portions may be combined into integrated display portions. All such features are to be understood to be within the scope of the present disclosure. Furthermore, interface 52 shown in FIG. 6 may be configured to allow a user to enable/disable tire pressure control system 18 based on an on/off input, time of day, driver identification, vehicle location, and so on.

Referring back to FIG. 3, according to one embodiment controller 20 controls (e.g., maintains, increases, or decreases) the air pressure within tires 14 by way of pressure regulator 22 based on one or more types of data (e.g., road data, environment data, etc.) and/or other information. In one embodiment, based on the various types of data and information, controller 20 determines a target air pressure for one or more tires. Based on the target air pressure and the current air pressure (as provided, for example, by tire sensors 26), controller 20 controls operation of pressure regulator 22 to adjust the air pressure within tires 14 accordingly.

In one embodiment, the road data includes location data for an advanced location of road conditions, such that based on a the advanced location, the current location of the vehicle, and the speed/direction of travel of the vehicle, controller 20 can determine a point in time at which vehicle 10 will arrive at the advanced location, and control operation of pressure regulator 22 such that the air pressure within tires 14 is adjusted for road conditions at an advanced location by the time vehicle 10 arrives at the advanced location, thereby anticipating road conditions and adjusting tire pressure in real time to accommodate such conditions. Anticipating road conditions in this manner may provide enhanced tire pressure control relative to other techniques that rely on adjusting tire pressure based primarily or solely on road conditions directly beneath the vehicle and/or on data from off-board sources.

As an example, road sensor 24 may detect wet or icy conditions along road 34 (see FIGS. 4-5) and provide road data indicating such conditions to controller 20. Controller 20, in turn, controls operation of pressure regulator 22 to vary the air pressure of tires 14 accordingly. For example, to provide enhanced handling of vehicle 10 in wet or icy conditions, controller 20 may determine that a relatively lower air pressure is more desirable, and control operation of pressure regulator 22 such that the air pressure of tires 14 is reduced upon vehicle 10 travelling over the wet or icy road area.

It should be noted that in one embodiment, controller 20 and pressure regulator control all of the tires of a vehicle in the same manner (e.g., such that a single target pressure is determined for all tires, and all tires are adjusted to be at the same target pressure). In other embodiments, it may be desirable to control tires 14 on an individual basis, e.g., while driving on a curve, or when the vehicle's load is applied differently to different tires. As such, in some embodiments, controller 20 is configured to determine a target pressure for one or more individual tires, and control pressure regulator 22 accordingly. In further embodiments, controller 20 may control the air pressure within less than all of the tires on vehicle 10. For example, controller 20 may control the front wheels only, the rear wheels only, and so on. In some embodiments, selective control of less than all of the wheels of vehicle 10 is based on a user input, road conditions, whether a wheel is coupled to a drive transmission or other factors.

Figure 7:
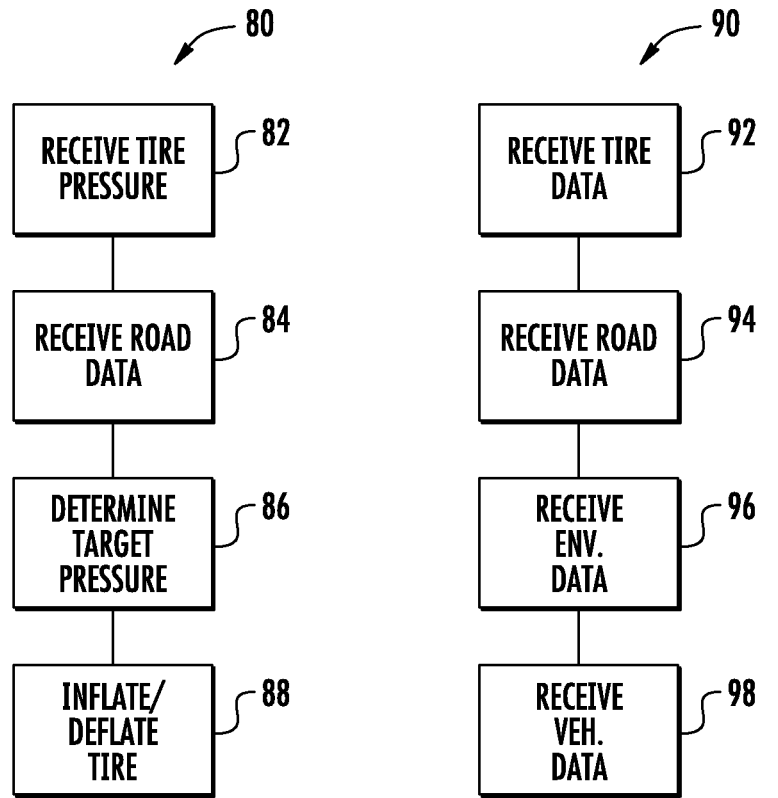
FIG. 7 is a block diagram of a method of controlling air pressure within a tire according to one embodiment.

In some embodiments, one or more sensors disclosed herein may acquire data regarding the current state of the tire (e.g., tire compliance, traction, friction coefficient, tread condition, tire temperature, etc.). Based on the current state of the tire, target air pressure determinations may be modified to adapt to inconsistencies between the actual tire state and an expected tire state (e.g., as determined when determining an initial target pressure for tires 14). Furthermore, controller 20 may store historic road location data, road conditions, and air pressure settings (e.g., in memory 46) such that controller 20 can access the historic data and determine future target pressure settings base at least in part on the historic data Referring now to FIG. 7, method 80 of controlling air pressure within one or more tires is shown according to one embodiment. A tire pressure is received (82). In one embodiment, the tire pressure is received as tire data from one or more tire sensors such as tire sensor 26. Road data is received (84). In one embodiment, road data regarding road conditions, etc. at an advanced location is received from one or more road sensors such as road sensor 24. A target pressure is determined (86). Based on the received tire pressure and road data, a target pressure for one or more tires may be determined by, for example, controller 20. The tire pressure of one or more tires is adjusted (e.g., maintained, increased, or decreased) based on the target pressure (88). In one embodiment, controller 20 controls operation of a pressure regulator such as pressure regulator 22 to control the pressure within one or more tires such as tires 14. The pressure regulation is timed such that the target pressure is achieved as vehicle 10 arrives at the advanced location corresponding to the road data.

Figure 8:
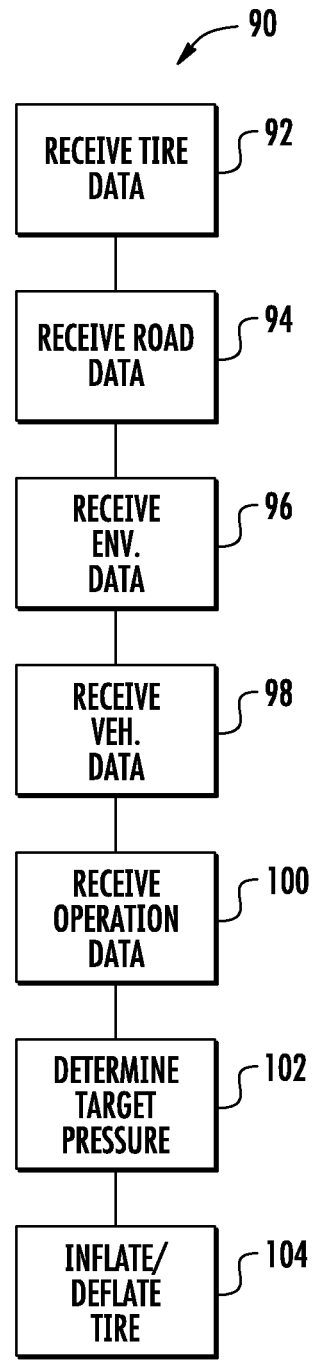
FIG. 8 is a block diagram of a method of controlling air pressure with a tire according to another embodiment.

Referring to FIG. 8, method 90 of controlling air pressure within one or more tires is shown according to one embodiment. Tire data is received (92). In one embodiment, tire data is received from a tire sensor such as tire sensor 26 and may include data such as tire pressure, tire temperature, tread condition, etc. Road data is received (94). In one embodiment, road data regarding road conditions, etc. at an advanced location is received from one or more road sensors such as road sensor 24. Environment data is received (96). In one embodiment, environment data is received from an environment sensor such as environment sensor 28, and may include various data such as temperature, pressure, weather conditions, etc.

Referring further to FIG. 8, vehicle data is received (98). Vehicle data may be received from one or more vehicle sensors or systems, and may include data such as vehicle weight/load distribution, speed, acceleration, braking data, navigation system data, and the like. Operator data is received (100). One or more inputs from an operator may be received from an operator by way of an operator input/output device, or alternatively, from memory on board or remote from vehicle 10, and the operator data may include operator preferences or settings, an operator identification, and the like.

Based on the received data, a target pressure is determined (102). It should be noted that the target pressure may be determined taking more or less data into account than that described with respect to FIG. 8. For example, environment data, vehicle data, and/or operator data may be omitted. Alternatively, remote data from a remote source, such as weather/traffic reports, may further be considered in determining the target pressure. Based on the target pressure, air pressure within one or more tires is adjusted (104). The pressure regulation is timed such that the target pressure is achieved as vehicle 10 arrives at the advanced location corresponding to the road data.

The various embodiments disclosed herein may provide various benefits over other tire pressure control techniques. By sensing road or other conditions in advance of a vehicle location, tire pressure can be adjusted in a timed manner so as to have an appropriate tire pressure upon encountering various road conditions, etc. Higher pressure may be utilized in normal, smooth road conditions, and reduced pressures may be used with rougher roads, poorer traction conditions, etc. Further, tire pressure can be adjusted in advance of curves, expected turns, inclines/declines, and the like.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vehicle tire pressure control system, comprising:
a road sensor configured to acquire road data regarding a road at an advanced location ahead of a current location of a vehicle;
a pressure regulator configured to control the air pressure within a tire of the vehicle during operation of the vehicle; and
a controller configured to determine a target pressure for the tire based on the road data corresponding to the advanced location, and control operation of the pressure regulator based on the target pressure and the advanced location such that the air pressure of the tire is at the target pressure before the vehicle arrives at the advanced location.

2. The system of claim 1, wherein the road sensor includes at least one of a radar device, a lidar device, a multi-spectral sensor, a polarization sensor, an infrared sensor device, and an ultraviolet sensor.

3. The system of claim 1, wherein the road sensor includes a micropower impulse radar device.

4. The system of claim 1, wherein the road sensor includes a Doppler sensor.

5. The system of claim 1, wherein the road sensor includes at least one of a still image camera and a video camera.

6. The system of claim 1, wherein the road data includes a surface state of the road at the advanced location.

7. The system of claim 6, wherein the surface state includes at least one of a degree of wetness, a depth of water, a presence of snow or ice, a presence of oil, a presence of a hole, a presence of surface roughness, or a presence of an obstacle.

8. The system of claim 1, wherein the road data includes a surface type of the road at the advanced location.

9. The system of claim 8, wherein the surface type includes at least one of gravel, dirt, concrete, asphalt, or pavement.

10. The system of claim 1, wherein the road data provides an indication of an upcoming curve in the road.

11. The system of claim 1, wherein the road data provides an indication of an upcoming change in elevation of the road.

12. The system of claim 1, further comprising a tire sensor configured to acquire tire data regarding the tire;
wherein the controller is further configured to control operation of the pressure regulator based on the tire data.

13. The system of claim 12, wherein the tire data further includes at least one of a temperature of the tire, a tread condition of the tire, a tread pattern of the tire, a width of the tire, and a compliance of the tire.

14. The system of claim 1, wherein the controller is configured to:
determine a predicted tire condition for the advanced location;
monitor an actual tire condition at the advanced location; and
adjust a target air pressure for the tire based on the predicted and actual tire conditions at the advanced location.

15. A vehicle, comprising:
a tire configured to support at least a portion of the vehicle; and
a tire pressure control system configured to control the air pressure within the tire during operation of the vehicle, the tire pressure control system including:
a road sensor configured to acquire road data regarding a road at an advanced location ahead of a current location of the vehicle;
a pressure regulator configured to control the air pressure within the tire during operation of the vehicle; and
a controller configured to determine a target pressure for the tire based on the road data corresponding to the advanced location, and control operation of the pressure regulator based on the target pressure and the advanced location such that the air pressure of the tire is already at the target pressure when the vehicle arrives at the advanced location.

16. The vehicle of claim 15, wherein the road sensor includes at least one of a radar device, a lidar device, a multi-spectral sensor, a polarization sensor, an infrared sensor device, and an ultraviolet sensor.

17. The vehicle of claim 15, wherein the road sensor includes a micropower impulse radar device.

18. The vehicle of claim 15, wherein the road sensor includes a Doppler sensor.

19. The vehicle of claim 15, wherein the road sensor includes at least one of a still image camera and a video camera.

20. The vehicle of claim 15, further comprising a tire sensor configured to acquire tire data regarding the tire;
wherein the controller is further configured to control operation of the pressure regulator based on the tire data.

21. The vehicle of claim 20, wherein the tire data further includes at least one of a temperature of the tire, a tread condition of the tire, a tread pattern of the tire, a width of the tire, and a compliance of the tire.

22. The vehicle of claim 15, wherein the controller is configured to control operation of the pressure regulator further based on at least at least one of a weight of the vehicle and a load distribution of the vehicle.

23. The vehicle of claim 15, wherein the controller is configured to control operation of the pressure regulator to optimize at least one of a speed, handling, and a fuel efficiency at the advanced location based on a user input.

24. The vehicle of claim 15, wherein the controller is configured to:
determine a predicted tire condition for the advanced location;
monitor an actual tire condition at the advanced location; and
adjust a target air pressure for the tire based on the predicted and actual tire conditions at the advanced location.

25. A tire pressure control system, comprising:
a road sensor configured to acquire road data regarding an advanced location ahead of a current location of a vehicle on a road;
an environment sensor configured to acquire environment data regarding an environment at an exterior of the vehicle;
a vehicle sensor configured to acquire vehicle data regarding operation of the vehicle;
a pressure regulator configured to control an internal pressure of a tire; and
a controller configured to:
determine a target air pressure for the tire based on the road data, environment data, and the vehicle data; and
control operation of the pressure regulator based on the target pressure and a current air pressure of the tire such that the air pressure of the tire is at the target pressure as the vehicle arrives at the advanced location.

26. The system of claim 25, wherein the road data provides an indication of an upcoming curve in the road.

27. The system of claim 25, wherein the road data provides an indication of an upcoming change in elevation of the road.

28. The system of claim 25, wherein the tire includes a plurality of tires, and wherein the controller is configured to control operation of the pressure regulator to vary the air pressure between tires.

29. The system of claim 25, wherein the controller is configured to control operation of the pressure regulator to vary the air pressure between tires based on at least one of an anticipated turn in the road, a loading distribution of the vehicle, a tire condition for each of the plurality of tires, and a spatial difference between road conditions.

30. The system of claim 25, wherein the controller is configured to:
   determine a predicted tire condition at the advanced location;
   monitor an actual tire condition at the advanced location; and
   adjust a target air pressure for the tire based on the predicted and actual tire conditions at the advanced location.

31. The system of claim 30, wherein the controller includes a memory, and wherein the controller is configured to store historic data regarding at least one of a tire pressure, tire data, and a road condition for the current location of the vehicle in the memory.

32. The system of claim 31, wherein the controller is configured to control operation of the pressure regulator further based on the historic data.

* * * * *